March 20, 1928.
L. LANDRY
1,663,012
CENTRIFUGAL BRAKE MECHANISM
Filed May 2, 1927
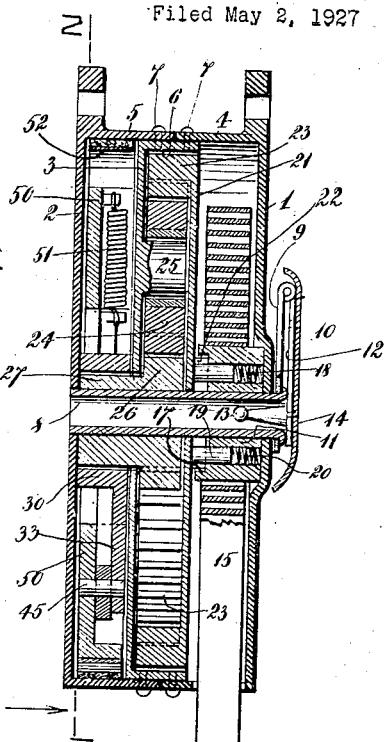
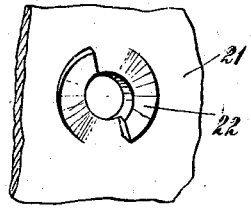
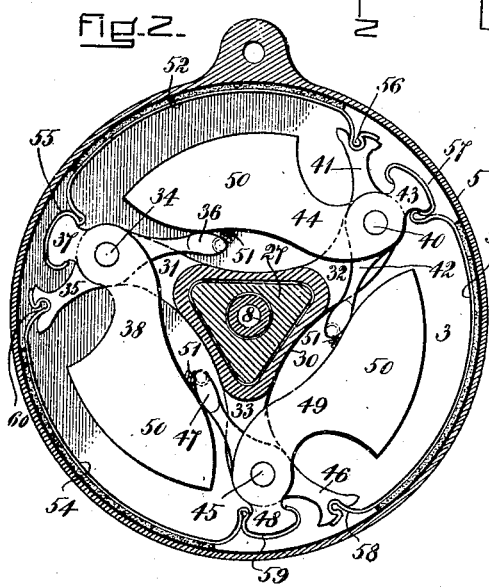
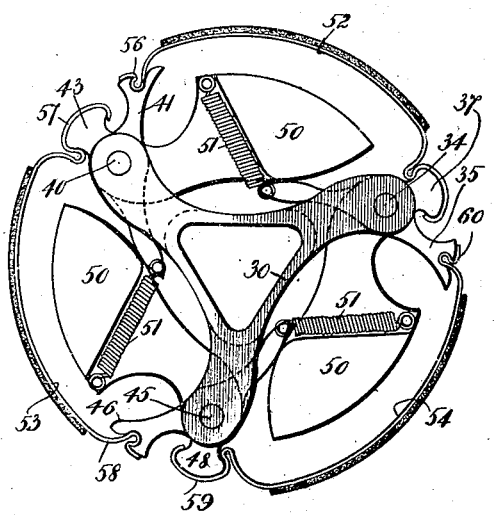
INVENTOR:
Louis Landry
BY
ATTORNEYS Patented Mar. 20, 1928.

1,663,012

UNITED STATES PATENT OFFICE.

LOUIS LANDRY, OF BERWICK, MAINE.

CENTRIFUGAL BRAKE MECHANISM.

Application filed May 2, 1927. Serial No. 188,090.

The invention relates to an improvement in centrifugal brake mechanisms and especially to brake mechanisms useful in connection with a fire escape or in any similar connection where a drop is effected and a centrifugal brake mechanism is employed to govern the speed of the drop.

The essential object of the inventon is to make the brake mechanism not only effective in its operation, but essentially also a safe mechanism or one that will properly respond to all demands upon it and especially sudden strains and will not so tighten or bind under any circumstance as to cause breakage in any of its operating parts or parts affecting its operation.

The invention can best be seen and understood by reference to the drawings in which—

Figure 1 is a view thereof in cross sectional elevation.

Fig. 2 is a cross section on the line 2—2 of Fig. 1 showing especially a front elevation of the brake mechanism.

Fig. 3 is a rear elevation of the brake mechanism shown in Fig. 2, and

Fig. 4 is a front elevation of a detail of construction to which reference will later be made.

Referring to the drawings:—

The body of the device comprises outer casing members 1 and 2 and a partition-forming member 3 which occupies a position interior the outer casing members 1 and 2 and spaced therefrom respectively. The several members 1, 2 and 3 are fastened rigidly together by means of rim flanges with which the several members are provided, the member 1 being provided with a rim flange 4, the member 2 with a rim flange 5 and the member 3 with a rim flange 6. The fastening together or combining of the respective members is obtained by fastening the rim flanges 4 and 5 of the outer casing members to the rim flange 6 of the partition member and which fastening is made by means of screws 7.

Centrally mounted to turn axially on the outer casing members with bearing thereon and with extension through the interior partition member is a spindle 8. The spindle is retained against endwise displacement by means of an arm 9 forming a part of a crank 10 by which the spindle is turned. The part 9 of the crank is secured to the end of the spindle just exterior the outer face of the casing member 1 and thereby operates by its bearing against the side of the casing to prevent inward displacement of the spindle. Endwise displacement of the spindle in a reverse direction is prevented by means of a drum 11 fixed to the spindle and arranged thereon to lie just adjacent the interior face of the casing member 1, where, by its bearing against the interior face of the casing, it will operate to prevent outward displacement of the spindle.

It is by means of the crank 10 that the spindle is turned manually. The crank comprises the arm 9, previously referred to, which is provided with a hinged extension 12 bearing a hand grip 13 by which the crank is turned when the arm extension 12 is extended. The adaptation of the arm extension 12 is such that when not in use it will fold against the arm 9, and the hand grip 13 on the end of the extension will enter and become socketed within the spindle, preferably made hollow. The arm extension 12 is also preferably provided with a cover 14 which when the arm extension is folded as aforesaid will engage the side of the casing member 1 and envelop the entire crank.

Fastened to the drum 11 is the inner end of a steel tape 15 which is adapted to be wound or coiled upon the drum as the spindle is turned by the operation of the crank for turning the drum, or the tape may be unwound from the drum in the operation of the device for actuating the working parts thereof as will later be explained.

The inner face of the drum 11 is provided with a recess 17 and is also provided on diametrically opposite sides of the spindle with openings 18. Slidably mounted within these openings, with extension into the recess 17 of the drum, are pins 19, 19. Each of these pins is backed by a spring 20 by means of which the pins have a normal outward projection. The pins 19 have engagement for turning a wheel 21 which loosely embraces the spindle 8 and is mounted to turn within the cavity provided by the partition member 3 and its rim flange 6.

The engagement of the pins with the wheel 21 for turning it is such that the pins engage the wheel only when the drum to which the steel tape is secured is moving or being turned in a counterclockwise direction. That is, the engagement of the drum with the wheel 21 through the interposed pins is such as will permit of the spindle being rotated manually by the crank 10 in a clockwise direction for winding the tape upon the drum without disturbing the wheel 21, but rotation of the wheel 21 will be obtained as the drum is moved in a reverse or counterclockwise direction by the unwinding of the tape. The engagement between the pins and wheel is secured by means of clutch members 22 formed on the outer face of the wheel 21, the form of the clutch members being such that the pins will ride over them as the drum carying the pins is moved in a clockwise direction, or the pins will engage the clutch members for turning the wheel 21 as the drum moves in a reverse or counterclockwise direction.

The wheel 21 is provided with an internally toothed rim flange 23. In engagement with the teeth of this flange is a pinion gear 24 which is mounted to turn on a fixed boss 25 projecting outwardly from the side of the partition member 3. Meshing with the pinion gear 24 is a gear 26 arranged to turn upon the spindle 8 and provided with a triangular-shaped gear piece 27 which extends along the spindle into the chamber containing the brake mechanism, and by which gear piece the mechanism is actuated, as will presently be explained. In other words, as the gear 21 is turned in the operation of the device upon the unwinding of the tape 15 the motion thereof will be transmitted through the pinion gear 24 to the gear 26 and thence through the gear piece 27 forming a part or side extension of the gear 26 for actuating the brake mechanism.

The brake mechanism comprises a number of parts located within a chamber formed between the casing member 2 and the partition 3 and bounded exteriorly by the annular rim 5 of the casing member 2. The brake mechanism comprises a triangular-shaped centerpiece 30 adapted to receive the triangular-shaped gear piece 27 which projects from the gear 26. The centerpiece 30 is provided with three radiating arms 31, 32 and 33, respectively, arranged equidistant from one another. Pivoted to the ends of each of these arms are sets of separate levers which are alike for all of the arms. Thus the arm 31 has pivoted to it by a pin 34 a lever having arms 35 and 36, respectively, and also a lever having arms 37 and 38, respectively, the same pin 34 serving as the pivotal support for both levers. Likewise the arm 32 has pivoted to it by a pin 40 a lever having arms 41 and 42, respectively, and also a lever having arms 43 and 44, respectively, the same pin 40 serving as a pivotal connection for both levers. In similar manner the arm 33 has pivoted to it by a pin 45 a lever having arms 46 and 47, respectively, and also a lever having arms 48 and 49, respectively, the same pin 45 serving as a pivotal connection for both levers. Each one of the arms 38, 44 and 49 of the several levers of which these arms form a part are weighted arms, each bearing upon its end a weight 50, and the arrangement of these lever arms with relation to their respective pivotal connections is such that as the brake mechanism is rotated these arms by reason of their weighting will be thrown outwardly by the action of centrifugal force, causing the levers to turn on their pivotal connections and moving the several arms 37, 43 and 48 forming a part of these same levers of which the weighted arms form a part. Secured to each of the weighted arms 38, 44 and 49, respectively, are coiled springs 51 which connect respectively with the other levers. Thus the spring 51 connected to the weighted lever arm 38 is connected to the lever arm 47. Likewise the spring 51 connected to the weighted arm 44 is connected to the lever arm 36 and the spring 51 connected to the weighted lever arm 49 is connected to the lever arm 42. With the connections thus made by means of the interposed springs, as the weighted lever arms are thrown outwardly by the action of centrifugal force a pull will be exerted through the several springs upon the several arms 47, 36 and 42, drawing these arms outwardly and moving the several lever arms 46, 35 and 41 forming a part of the same levers. The springs 51 also assist in maintaining all the levers in a normal retracted position.

52, 53 and 54, respectively, represent curved braking strips of a resilient material and covered with a facing of leather or other frictional material. These braking strips are arranged just inside the interior face of the rim 5 of the casing member 2, and in the operation of the brake mechanism are adapted to be thrown into contact with the interior surface of the rim 5 and thereby operate as a braking medium for impeding the rotation of the brake mechanism. The displacing of these curved braking strips to engage the rim 5 is effected by distorting or bending the strips by an application of pressure to the opposite ends thereof which tends, owing to the pressure thus effected, to throw the body of the strip outwardly and its facing against the interior of the rim 5. The bending or distortion of the strips is effected by means of the levers previously referred to, the arms of the several levers having jaws upon their ends which receive and hold the ends of the respective braking strips. Thus the end of the lever arm 37 is adapted to receive and hold an end 55 of the braking strip 52, while the opposite end 56 of this strip is received and held by the lever arm 41. Likewise the end 57 of the braking strip 53 is received and held by the lever arm 43, while the opposite end 58 of this strip is received and held by the lever arm 46. In similar manner the end 59 of the strip 54 is received and held by the lever arm 48, while the opposite end 60 of this strip is received and held by the lever arm 35.

With the lever arms thus arranged and connected to the ends of the brake strips, all the strips will become bent or distorted to engage the rim 5 of the casing member 2 by pressure applied from the opposite ends of the strips as the weighted arms 38, 44 and 49 are thrown outwardly by centrifugal force as the centerpiece is rotated. The strip 52 will be compressed by motion of the arms 37 and 41 being actuated to move toward one another, the arm 37 being moved directly by the weighted arm 38 and the arm 41 being moved indirectly by the weighted arm 49 through the spring connecting with the arm 42; the strip 53 will be compressed by movement of the arms 43 and 46 which are actuated to move toward one another, the arm 43 being moved directly by the weighted arm 44 and the arm 46 being moved indirectly by the weighted arm 38 through the spring connecting with the arm 47; and the spring 54 will be compressed by movement of the lever arms 48 and 35 respectively toward one another, the arm 48 being moved directly by the weighted arm 49 and the arm 35 being moved indirectly by the weighted arm 44 through the spring connecting with the lever arm 36.

The manner of application of pressure to the opposite ends of the brake strips for bending or distorting them is preferably such that the lever arms for applying pressure, actuated directly by the weighted arms, will operate against the rear ends of the strips and the arms for applying pressure, which are actuated indirectly by the weighted arms through the spring connections, will operate against the forward ends of the brake strips. In other words, looking at the brake mechanism as illustrated in Fig. 2, this entire mechanism will, by the rotation of the centerpiece 30, be rotated in a clockwise direction and accordingly the arms 37, 43 and 48 respectively, which are operated directly by the weighted arms, will bear against the rear ends of the respective strips 52, 53 and 54. On the other hand, the arms 41, 46 and 35, which are operated indirectly by weighted arms through the spring connections, will bear directly against the forward ends of the respective brake strips 52, 53 and 54.

Having thus fully described my invention, I claim and desire to secure by Letters Patent of the United States:—

1. In a centrifugal brake mechanism, the combination comprising an exterior casing, a number of flexible brake strips each arranged to frictionally engage the interior of the casing when distorted by the application of pressure to its opposite ends, a rotary centerpiece within the casing having arms, means for rotating the centerpiece, levers pivoted to the arms of the centerpiece and connected respectively to said strips at one end thereof for applying pressure thereto as said levers are operated, each of said levers having a weighted arm displaceable outwardly by centirfugal force when said centerpiece is rotated and by the displacement of which weighted arm the lever is operated, other levers pivoted to said arms of the centerpiece and connected respectively to the other ends of said strips for applying pressure thereto as said other levers are operated, and means whereby said other levers will be operated by the weighted arms of the levers first mentioned.

2. In a centrifugal brake mechanism, the combination comprising an exterior casing, a number of flexible brake strips each arranged to frictionally engage the interior of the casing when distorted by the application of pressure to its opposite ends, a rotary centerpiece within the casing having arms, means for rotating the centerpiece, levers pivoted to the arms of the centerpiece and connected respectively to said strips at one end thereof for applying pressure thereto as said levers are operated, each of said levers having a weighted arm displaceable outwardly by centrifugal force when said centerpiece is rotated and by the displacement of which weighted arm the lever is operated, other levers pivoted to said arms of the centerpiece and connected respectively to the other ends of said strips for applying pressure thereto as said other levers are operated, and springs connecting arms of said other levers to the weighted arms of the levers first mentioned whereby said other levers will be operated by the weighted arms for applying pressure to said other ends of the strips as said weighted arms are displaced outwardly as aforesaid.

3. In a centrifugal brake mechanism, the combination comprising an exterior casing, a number of flexible brake strips each arranged to frictionally engage the interior of the casing when distorted by the application of pressure to its opposite ends, a rotary centerpiece within the casing having arms, means for rotating the centerpiece, levers pivoted to the arms of the centerpiece and connected respectively to the rear ends of said strips for applying pressure thereto as the levers are operated, each of the levers having weighted arms displaceable outwardly by centrifugal force when said centerpiece is rotated and by the displacement of which weighted arm the lever is operated, other levers pivoted to the arms of the centerpiece and connected respectively to the forward ends of said strip for applying pressure thereto as said levers are operated, and tension means connecting arms of said other levers to the weighted arms of the levers first mentioned whereby said other levers will be operated by the weighted arms for applying pressure to the forward ends of said strips as said weighted arms are displaced outwardly as aforesaid.

LOUIS LANDRY.